Aug. 14, 1928.
LE ROY PURCELL
BOLT FASTENING
Filed Jan. 12, 1926
1,681,048
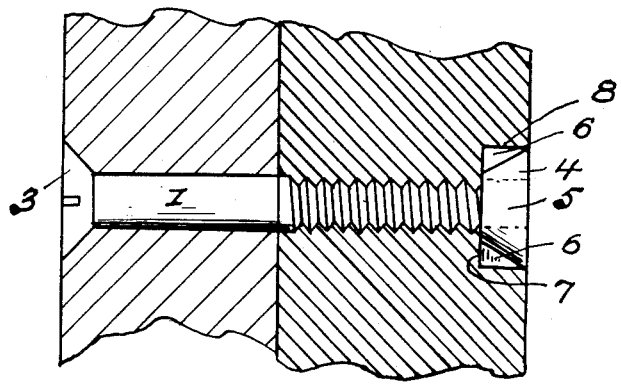
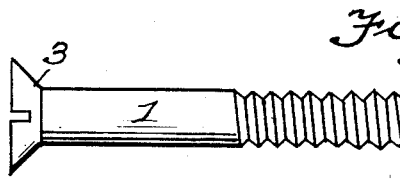
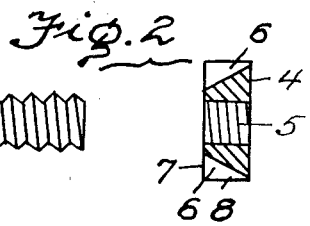
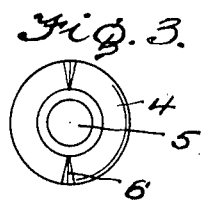
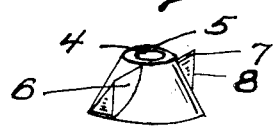
Inventor
Le Roy Purcell,
By Gould & Gould
Attorney Patented Aug. 14, 1928.

1,681,048

UNITED STATES PATENT OFFICE.

LE ROY PURCELL, OF JUDSON, INDIANA.

BOLT FASTENING.

Application filed January 12, 1926. Serial No. 80,841.

This invention is directed to an improvement in terminal fastenings for bolts used in connecting wood or similar sections together, and is primarily adapted to forming a fastening having threaded cooperation with the bolt, seating in an appropriately formed countersink surrounding the bolt terminal, and formed to interlock with the wall of the countersink to hold the fastening against turning.

It has heretofore been difficult to simply and securely hold a bolt used to unite wood sections, particularly in cabinet or like work, in that the fastening must be of a nature to permit easy application with usual tools, must be capable of being readily disconnected when necessary, and yet must lie flush with the surface in which it is embedded, or even below such surface, in order to conceal the connection where otherwise exposed, or to permit the proper fitting of overlying parts. In this connection the usual nut will not serve the purpose, as it must be exposed to permit the application of a wrench, and ordinarily cannot be concealed.

The object of the present invention is therefore to provide a fastening of this type formed to interfit in a countersink in the wood surface and having outstanding fins of peculiar form to cut into and interlock with the wall of the countersink as the fastening is driven in place, with this application permitting the threaded opening through the fastening to be properly alined with the bolt opening to permit the bolt to be threaded into the fastening.

The invenion is illustrated in the accompanying drawing, in which :—

Fig. 1 is a view in section, with the bolt and fastening in elevation, illustrating the application of the improved fastening.

Fig. 2 is a view of the bolt in elevation and the fastening in section, the parts being shown separated.

Fig. 3 is an end view of the fastening.

Fig. 4 is a perspective view of the fastening.

In the drawings the usual bolt 1 shown as connecting two wood sections 2, has the usual kerfed head 3 countersunk in one of the wood sections. The opposite end of the bolt must be secured to maintain the connection, and heretofore it has been the usual practice to bore a cylindrical recess around the bolt opening of sufficient size to permit the use of an ordinary nut, which after being applied is concealed by a disk closing the outer end of the recess.

The present form of fastening is directed to avoiding the construction usually employed, and at the same time avoiding the difficulties of applying and removing such fastenings. To this end the present fastening is in the form of a frustro-conical member 4, centrally formed with a threaded opening 5 to receive the bolt, and formed with cutting and locking fins 6 on its peripheral surface. The member 4 is externally of a size and shape to accurately fit an ordinary countersink, so that in providing for the use of the improved securing means all that is necessary, after boring the wood sections for the passage of the bolt, is to countersink the wood about the outlet of the bolt opening.

An important feature of the present improvement are the fins 6, which while here shown as two in number and diametrically-opposed, may obviously be in any desired number and in any relative arrangement. These fins are integral with the body of the fastening member, and have their base portions coextensive with the length of the peripheral wall of the member. In side elevation the fins are substantially triangular with one edge, as 7 practically in the plane of the small or inner end of the fastening, and the remaining edge, as 8, substantially parallel with the axis of the member. The inner edge 7 of the fin is comparatively sharp to form a cutting edge, while the outer edge 8 is rather blunt, and in fact such edge 8, viewed in elevation, as in Fig. 4, is of triangular outline.

In applying the fastening after countersinking the appropriate opening, the latter is simply driven into the countersink until the outer end of the member is flush with the wood surface. In this operation the member when finally positioned accurately fits and fills the countersink, so that the threaded opening 5 of the member is in line with the bolt opening. In thus applying the member, the fins 6 cut into the wall of the countersink, the edge 7 forming the cutting edge. As the member is finally seated the fins are well within the wood and the widened edge 8 forms a wedge-like resistance to any possible turning of the member. The bolt is then applied, seated by the usual screw-driver, and threaded into the fastening. If the end of the bolt projects beyond the outer surface of the fastening, such projection may be filed off or otherwise removed, with the result that when properly applied a perfectly secure fastening is provided, with the outer surface perfectly flush with the surface of the wood. Of course the fastening is easily removed by disconnecting the bolt a short distance, and then driving on the headed end of the bolt to dislodge the fastening.

The improved fastening is perfectly flush with the surface to which it is applied, and yet holds the bolt and wood sections as secure as with an ordinary nut. The important features are the form of the fastening to fit the ordinary countersink, and the provision and particularly the form of the fins to interlock with the wood to prevent turning of the fastening.

Having thus described the invention, what is claimed as new is:—

A fastening for the threaded end of a bolt and adapted to be wholly embedded in formed opening in the material, comprising a conical body with an inner end face and an outer end face of circular form and in parallel relation, the outer end face accurately fitting within the outer end of the formed opening and being flush with the surface of the material, and fins projecting in diametrically-opposed relation from and beyond the inclined side wall of the fastening, the respective ends of each fin being in alinement with the respective end faces of the body, the diameter of the fastening taken through the fins being uniform for the full length of the fastener, the outer faces of the fins being triangular with their apices in alinement with the inner face of the body and their bases in alinement and merging into the contour of the outer face of the fastener, whereby the fins present a sharp end in alinement with and extending in both directions beyond the inner face of the fastener and are of gradually increasing thickness and of gradually decreasing width from the inner face to the outer face of the body.

In testimony whereof, I affix my signature.

LE ROY PURCELL.